(12) United States Patent
Watanabe et al.

(10) Patent No.: US 12,202,341 B2
(45) Date of Patent: Jan. 21, 2025

(54) DISPLAY DEVICE FOR VEHICLE

(71) Applicant: SUZUKI MOTOR CORPORATION, Hamamatsu (JP)

(72) Inventors: Akinobu Watanabe, Hamamatsu (JP); Toshihisa Haraki, Hamamatsu (JP); Shin Miura, Hamamatsu (JP); Ryusei Miyata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 193 days.

(21) Appl. No.: 18/117,792

(22) Filed: Mar. 6, 2023

(65) Prior Publication Data
US 2023/0302903 A1  Sep. 28, 2023

(30) Foreign Application Priority Data
Mar. 28, 2022 (JP) ................................. 2022-051925

(51) Int. Cl.
*B60K 35/00* (2024.01)
*B60K 35/22* (2024.01)
*B60K 35/28* (2024.01)
*B60K 35/81* (2024.01)

(52) U.S. Cl.
CPC .............. *B60K 35/00* (2013.01); *B60K 35/22* (2024.01); *B60K 35/28* (2024.01); *B60K 35/81* (2024.01); *B60K 2360/167* (2024.01); *B60K 2360/178* (2024.01)

(58) Field of Classification Search
CPC ........ B60K 35/00; B60K 35/22; B60K 35/81; G09G 2330/021; G06F 3/1423
USPC ............................................................ 701/36
See application file for complete search history.

(56) References Cited

U.S. PATENT DOCUMENTS

| | | | |
|---|---|---|---|
| 2016/0031475 A1 | 2/2016 | Wang et al. | |
| 2016/0314752 A1 | 10/2016 | Nakano et al. | |
| 2019/0025829 A1* | 1/2019 | Fujiwara | ............... G06F 3/1423 |
| 2019/0114132 A1 | 4/2019 | Chu et al. | |
| 2021/0282714 A1 | 9/2021 | Miyazaki et al. | |

(Continued)

FOREIGN PATENT DOCUMENTS

| | | |
|---|---|---|
| DE | 102021105239 A1 | 9/2021 |
| JP | 2012037570 A | 2/2012 |
| JP | 2015-099100 A | 5/2015 |

(Continued)

OTHER PUBLICATIONS

European Extended Search Report issued in European Patent Application No. 23152903.3 dated Sep. 11, 2023.

(Continued)

*Primary Examiner* — Isaac G Smith
(74) *Attorney, Agent, or Firm* — TROUTMAN PEPPER HAMILTON SANDERS LLP

(57) ABSTRACT

A display device for a vehicle includes a plurality of displays mounted in a vehicle; an electronic control unit that controls, in an integrated manner, information displayed on the plurality of displays; and a telltale display that displays a telltale of the vehicle. The electronic control unit includes a first microcomputer that controls a display state of each of the plurality of displays, and a second microcomputer that operates with lower power consumption than the first microcomputer and controls a display state of the telltale display.

4 Claims, 3 Drawing Sheets

(56) References Cited

U.S. PATENT DOCUMENTS

2022/0005556 A1    1/2022   Lake et al.
2022/0055560 A1    2/2022   Matsuyama

FOREIGN PATENT DOCUMENTS

| JP | 2016-203786 A | 12/2016 |
| JP | 2020-183209 A | 11/2020 |
| JP | 2021047116 A | 3/2021 |

OTHER PUBLICATIONS

First Examination Report issued in corresponding Indian Patent Application No. 202314006780 dated Apr. 29, 2024.
Introduction of S2D13V02 (Telltale Monitoring IC for Automotive Display), May 21, 2021, YouTube link https://www.youtube.com/watch?v=12KPYOer7_U.
Office Action issued in Japanese Patent Application No. 2022-051925 dated Jun. 27, 2023.

* cited by examiner

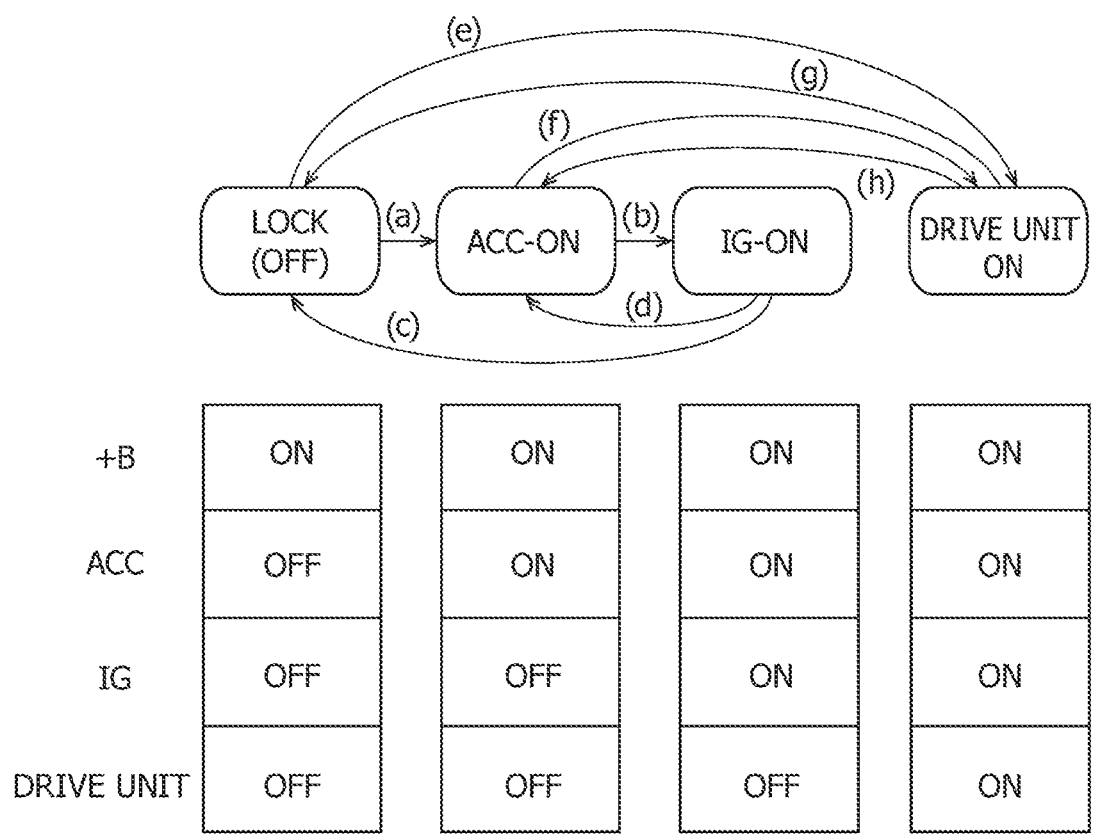

DISPLAY DEVICE FOR VEHICLE

CROSS REFERENCE TO RELATED APPLICATION

The present application claims priority of Japanese Patent Application No. 2022-051925 filed Mar. 28, 2022. The entire contents of which are hereby incorporated by reference.

TECHNICAL FIELD

The present invention relates to a display device for a vehicle.

BACKGROUND

Conventionally, there has been known a display device for a vehicle that displays information on a display mounted in a vehicle, such as an automobile. For example, JP 2021-047116 A discloses a display device for a vehicle (digital meter) configured in such a manner that when an ignition signal is off, a driver device operates based on an internal clock, whereby it is made possible to display information on a display part, while power consumption of a microcomputer can be restrained. Moreover, J P 2012-037570 A discloses a display device for vehicle (head-up display device) including a main display part that displays main information by driving a liquid crystal element, and a sub-display part that displays sub-information by driving a light-emitting diode.

SUMMARY

Incidentally, in many cases, a vehicle is equipped with a plurality of displays according to uses, such as a driver display on which information such as meter information is displayed, and a touch panel display on which audio, navigation, and other information is displayed. In general, a display state of each of the plurality of displays is controlled by an individually provided electronic control unit (ECU). However, in recent years, development of an integrated display system (IDS) has been promoted, which is configured in such a manner that a single ECU performs display control of individual displays in a centralized manner.

In development of an integrated display system, there is a problem in that the circuit scale of an ECU equipped with a microcomputer increases due to integration of functions, and power consumption of the system becomes greater because the entire system needs to be operated even if only one or some functions are enabled. An increase in power consumption is remarkable particularly when telltales, such as a warning light and an operation light that need to be displayed during user operation by regulation, are displayed by using color liquid crystal, because graphical processing by a GPU (Graphics Processing Unit) needs to be continuously performed while a liquid crystal panel and a back light are driven. The telltales set in a vehicle include those that need to be displayed when an ignition power supply is in an off state, and a battery may be greatly consumed when the power supply is off. The conventional display devices for vehicle as described above are not configured to support an integrated display system, and have room for improvement in terms of reduction in power consumption.

The present invention has been made in view of the aforementioned point, and an object thereof is to provide a display device for vehicle capable of performing display control of a plurality of displays in an integrated manner, and restraining battery consumption by reducing power consumption when a telltale is displayed.

An aspect of the present invention to achieve the aforementioned object provides a display device for vehicle including a plurality of displays mounted in a vehicle, and an electronic control unit that controls, in an integrated manner, information displayed on the plurality of displays. The display device for vehicle includes a telltale display that displays a telltale of the vehicle, and the electronic control unit includes a first microcomputer that controls a display state of each of the plurality of displays, and a second microcomputer that operates with lower power consumption than the first microcomputer and controls a display state of the telltale display.

According to the display device for vehicle of the present invention, it is possible to perform display control of a plurality of displays in an integrated manner, and to restrain battery consumption by reducing power consumption when a telltale is displayed.

BRIEF DESCRIPTION OF DRAWINGS

FIG. 4 is a diagram showing an example of on and off states of an uninterrupted power supply, an accessory power supply, an ignition power supply, and a drive unit (engine, electric motor, or the like) corresponding to state transitions of a vehicle power supply.

DETAILED DESCRIPTION

Hereinafter, an embodiment of the present invention will be described in detail with reference to the accompanying drawings.

Figure 1:
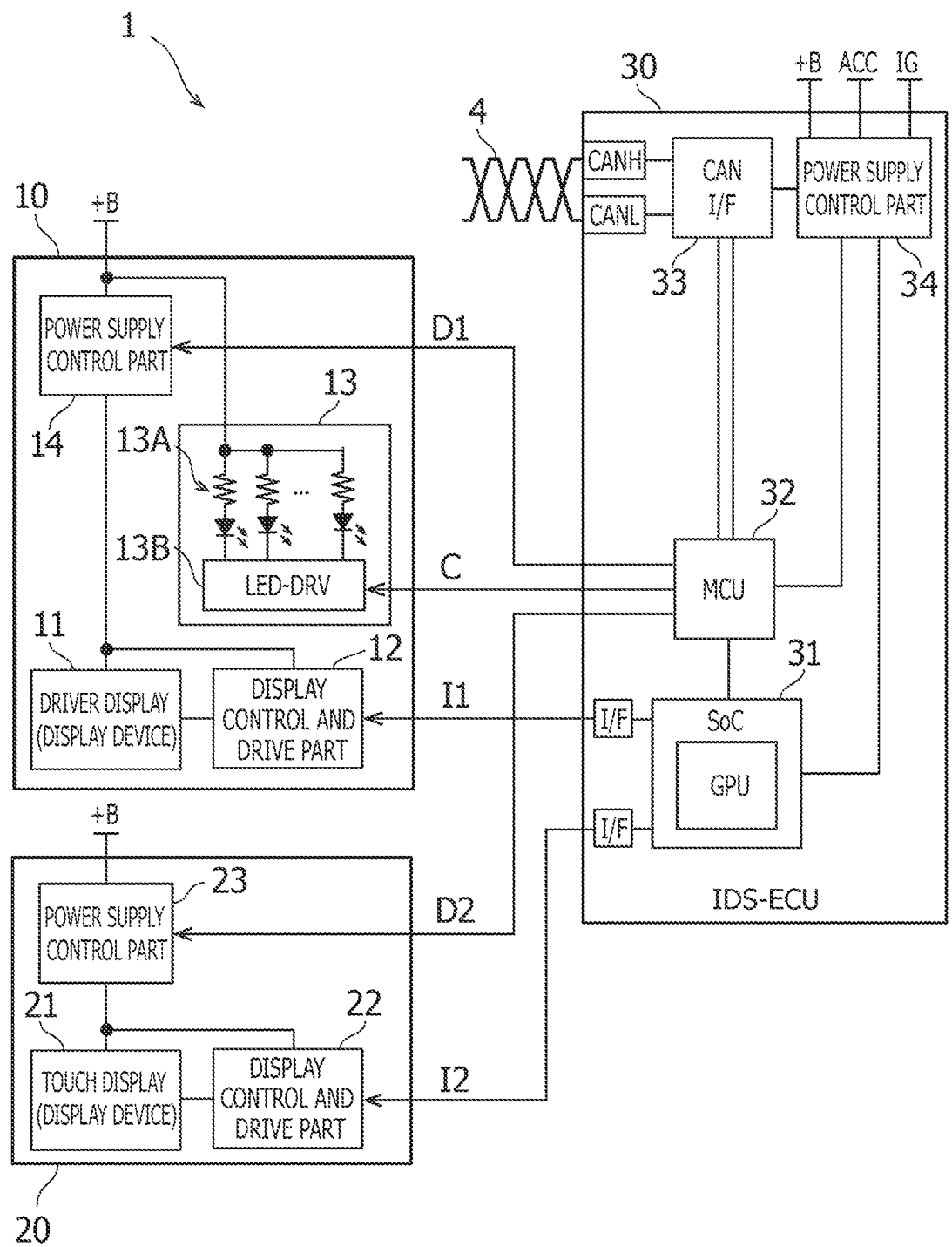
FIG. 1 is a block diagram illustrating a configuration of a display device for vehicle according to an embodiment of the present invention.

FIG. 1 is a block diagram illustrating a configuration of a display device for vehicle according to an embodiment of the present invention.

In FIG. 1, the display device for vehicle 1 according to the embodiment includes, for example, a driver display unit 10 capable of displaying information such as meter information, a touch display unit 20 capable of displaying audio, navigation, and other information, and an electronic control unit (IDS-ECU) 30 that controls display states of the driver display unit 10 and the touch display unit 20.

The driver display unit 10 includes a driver display 11, which is one of a plurality of (here, for example, two) displays mounted in the vehicle, a display control and drive part 12, a telltale display 13 installed adjacent to the driver display 11, and a power supply control part 14.

The driver display 11 is, for example, a thin-film-transistor-based active-matrix liquid crystal display (TFT-LCD). However, the driver display 11 is not limited to a TFT-LCD. The driver display 11 includes a back light that illuminates a liquid crystal panel (not shown) from a back face. The driver display 11 uses power from an on-board battery (not shown) for power supply. The driver display 11 is connected to a first microcomputer (SoC: System-on-Chip) 31, which will be described later, of the electronic control unit 30 via the display control and drive part 12 and a signal line.

Figure 2:
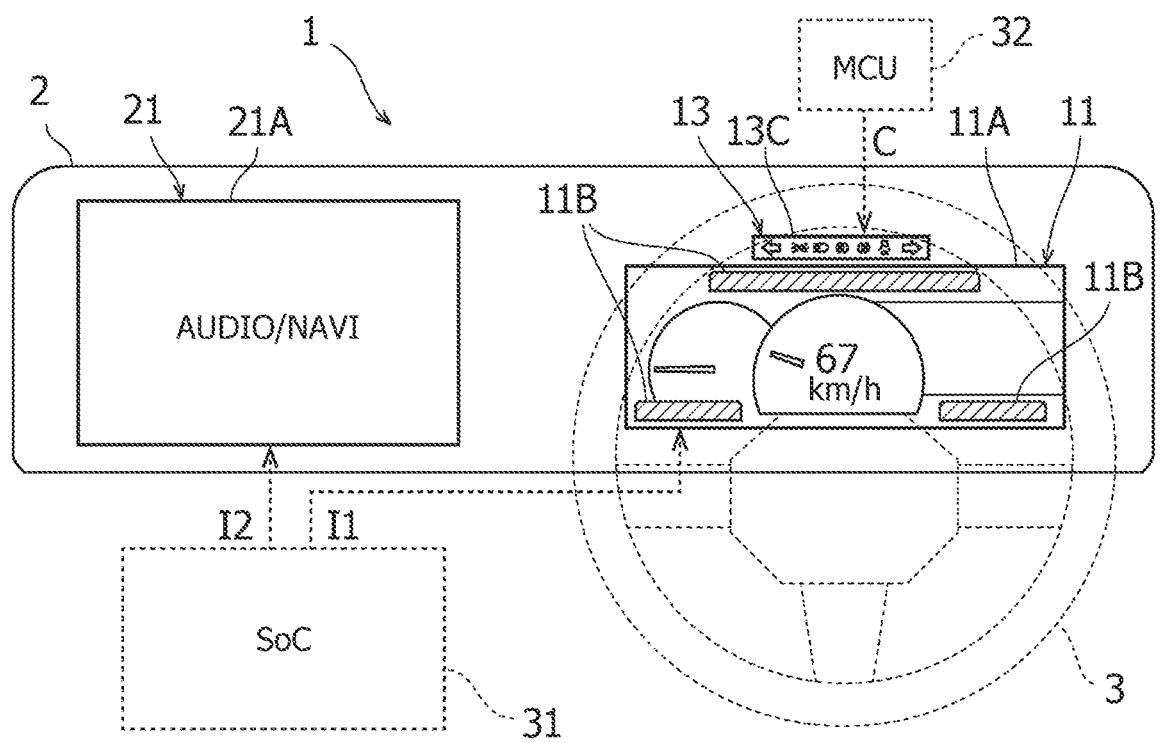
FIG. 2 is a view showing an appearance of the display device for vehicle according to the embodiment.

FIG. 2 is a view showing an appearance of the display device for vehicle 1. As shown in FIG. 2, a display screen 11A of the driver display 11 is provided at a position in front of a driver seat, on an instrument panel 2 installed in a front portion of a vehicle cabin. In other words, a driver sitting in the driver seat can see the display screen 11A of the driver display 11 over a steering wheel 3. The display screen 11A is formed in an approximately rectangular shape extending in a vehicle up-down direction and in a vehicle right-left direction.

In the display screen 11A of the driver display 11, for example, a video is displayed, including vehicle speed information, engine speed information, cumulative travel distance information, time information, and the like. Moreover, in the present embodiment, a video (icon) corresponding to a telltale that does not need to be displayed when an ignition power supply is in an off state, among a plurality of telltales set in the vehicle, is also displayed in the display screen 11A of the driver display 11. The off state of the ignition power supply is a state in which a drive unit (not shown) of the vehicle, such as an engine or an electric motor, is stopped, and a state in which a generator (alternator) does not operate and charging of the on-board battery is not performed. The video corresponding to the above-mentioned telltale can be arranged in, for example, an upper and lower end areas 11B (any hatched area in FIG. 2) or the like within the display screen 11A.

The telltale display 13 includes, for example, an LED circuit 13A using a plurality of light-emitting diodes (LEDs), and an LED drive circuit (LED-DRV) 13B that drives the LED circuit 13A (FIG. 1). The telltale display 13 is connected to an uninterrupted power supply (+B) of the vehicle. The uninterrupted power supply uses power from the on-board battery. A second microcomputer (MCU) 32, which will be described later, of the electronic control unit 30 is connected to the telltale display 13 through a signal line.

A display face 13C of the telltale display 13 is provided, for example, at a position adjacent to an outer side of an upper end of the display screen 11A of the driver display 11 (FIG. 2). The display face 13C is formed in an approximately rectangular shape extending in the vehicle right-left direction. In the display face 13C of the telltale display 13, a telltale that needs to be displayed when the ignition power supply is in the off state, among the plurality of telltales set in the vehicle, is displayed according to a light-emitting state of each LED of the LED circuit 13A. For each LED of the LED circuit 13A, a small-sized low-power-consumption device can be used because an illumination range is very small, compared to the back light of the driver display 11.

Figure 3:
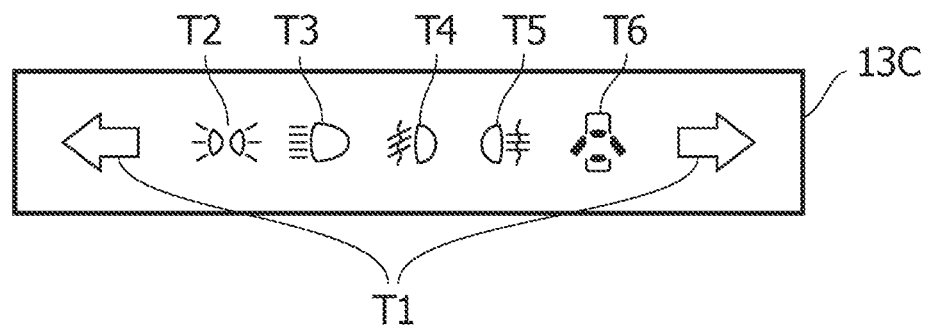
FIG. 3 is an enlarged view showing an example of telltales displayed on a telltale display in the embodiment.

FIG. 3 is an enlarged view showing an example of the telltales displayed on the telltale display 13. In the example in FIG. 3, for telltales that need to be displayed when the ignition power supply is in the off state, among the plurality of telltales set in the vehicle, six types of telltales T1 to T6 are configured to be displayed in the display face 13C of the telltale display 13, according to a light-emitting state of each LED of the LED circuit 13A. Specifically, the telltales T1 arranged in both right and left end portions of the display face 13C indicate activation (hazarding) of right and left turn signals. The second telltale T2 from the left in the display face 13C indicates lighting of headlights. The third telltale T3 from the left in the display face 13C indicates up-pointing (high beam) of the headlights. The fourth telltale T4 from the left in the display face 13C indicates lighting of a front fog light. The fifth telltale T5 from the left in the display face 13C indicates lighting of a rear fog light. The sixth telltale T6 from the left in the display face 13C indicates a state in which a door is not completely closed. A display color for each of the telltales T1 to T6 is set in such a manner so as to correspond to a color determined by regulations or the like.

The touch display unit 20 includes a touch display 21, which is one of the plurality of displays mounted in the vehicle, a display control and drive part 22, and a power supply control part 23 that controls a power supply thereof (FIG. 1). The touch display 21 is, for example, a thin-film-transistor-based active-matrix liquid crystal display (TFT-LCD) with a touch panel. However, the touch display 21 is not limited to a TFT-LCD. The touch display 21, similarly to the driver display 11, includes a back light that illuminates an liquid crystal panel (not shown) from a back face. The touch display unit 20 uses power from the on-board battery (not shown) for power supply. The touch display 21 is connected to the first microcomputer (SoC) 31, which will be described later, of the electronic control unit 30 via the display control and drive part 22 and a signal line.

A display screen 21A of the touch display 21 is provided on the instrument panel 2 similarly to the display screen 11A of the driver display 11, and is arranged on a side of the display screen 11A of the driver display 11, with a space in between (FIG. 2). In the present embodiment, the display screen 21A of the touch display 21 is provided around a middle portion in a vehicle width direction, in the front portion of the vehicle cabin, and it is configured in such a manner that the driver sitting in the driver seat and a passenger sitting in a passenger seat can see and can operate, by touching, the display screen 21A. The display screen 21A is formed in an approximately rectangular shape extending in the vehicle up-down direction and in the vehicle right-left direction. In the display screen 21A of the touch display 21, for example, a video is displayed, including audio operation information, navigation map and operation information, and the like.

The electronic control unit (IDS-ECU) 30 includes the above-mentioned first microcomputer (SoC) 31 and second microcomputer (MCU) 32, a communication interface (CAN I/F) 33 for connection with an in-vehicle network such as a CAN (Controller Area Network), and a power supply control part 34 for the unit (FIG. 1).

The first microcomputer 31 is configured to control respective display states of the driver display 11 and the touch display 21 in an integrated manner. The first microcomputer 31 is, for example, a microcomputer having a GPU (Graphics Processing Unit), a ROM (Read Only Memory), a RAM (Random Access Memory), and the like. The first microcomputer 31 can be configured by using a SoC (System-on-a-Chip) that is a single chip on which all necessary functions for operation of the driver display 11 and the touch display 21 are packaged.

Various information related to a state of the vehicle communicated over the in-vehicle network is transmitted to the first microcomputer 31 via the communication interface 33 and the second microcomputer. The first microcomputer 31 generates, in parallel, a video signal I1, which indicates a video to be displayed on the driver display 11, and a video signal I2, which indicates a video to be displayed on the touch display 21, based on the information from the in-vehicle network and the like, and transmits the generated video signal I1 to the driver display 11, and the video signal I2 to the touch display 21.

The second microcomputer 32 is configured to control a display state of the telltale display 13. The second microcomputer 32 is, for example, a microcomputer including a CPU (Central Processing Unit), a ROM, a RAM, and the like. Various information related to a state of the vehicle communicated over the in-vehicle network is transmitted to the second microcomputer 32 via the communication interface 33. The second microcomputer 32 generates an LED control signal C for controlling a driving state of the LED circuit 13A of the telltale display 13, based on the information from the in-vehicle network and the like, and transmits the generated LED control signal C to the LED drive circuit 13B by using a serial communication scheme or the like.

Note that although the present embodiment describes a configuration example in which the LED drive circuit 13B is provided separately from the second microcomputer 32, the second microcomputer 32 may include a function corresponding to the LED drive circuit 13B. Moreover, the second microcomputer 32 may include a function of monitoring an operation state of the first microcomputer 31 and detecting occurrence of an abnormality. By implementing the function of monitoring the first microcomputer 31 by using the second microcomputer 32 that performs display control of the telltale display 13, reliability of the integrated display system can be enhanced with a simple circuit configuration.

The communication interface 33 is connected to a communication line of the in-vehicle network 4 (CANH, CANL, and the like of a CAN bus). Detection information from various sensors mounted in the vehicle, control information from the various electronic control units, and the like are transmitted and received over the in-vehicle network. Moreover, the communication interface 33 may be connected not only to the in-vehicle network but also to an external connected service and the like through various communication channels. Information acquired from the connected service or the like is also transmitted to the first microcomputer 31 via the communication interface 33 and the second microcomputer 32.

Next, operation of the display device for vehicle 1 according to the present embodiment will be described.

In the display device for vehicle 1 configured as described above, the driver display unit 10, the touch display unit 20, and the electronic control unit 30 operate individually, in conjunction with a switch state of a switch for starting and stopping the drive unit (engine, electric motor, or the like) of the vehicle. Here, for example, a case is described in which starting and stopping of the drive unit are switched by using a vehicle power supply switch.

First, on and off states of the uninterrupted power supply (+B), an accessory power supply (ACC), the ignition power supply (IG), and the drive unit, corresponding to state transitions of the vehicle power supply, which are brought about by the vehicle power supply switch, are described with reference to an example shown in FIG. 4.

For example, as shown in an upper half of FIG. 4, the vehicle power supply transitions to any one of four states, LOCK (OFF), ACC-ON, IG-ON, and drive unit ON, depending on a press given to the vehicle power supply switch (or a position of a key) that is operated by a driver.

Specifically, with the vehicle power supply in the LOCK (OFF) state, when the driver presses the vehicle power supply switch without stepping on a brake pedal, the vehicle power supply transitions to the ACC-ON state (a), and when the driver further presses the vehicle power supply switch without stepping on the brake pedal, the vehicle power supply transitions to the IG-ON state (b).

Moreover, with the vehicle power supply in the IG-ON state, when the driver presses the vehicle power supply switch while a gearshift is in a parking (P) position, the vehicle power supply transitions to the LOCK (OFF) state (c). Alternatively, with the vehicle power supply in the IG-ON state, when the driver presses the vehicle power supply switch while the gearshift is in another position than the parking position, the vehicle power supply transitions to the ACC-ON state (d).

In addition, with the vehicle power supply in the LOCK (OFF) state, when the driver presses the vehicle power supply switch while stepping on the brake pedal, the vehicle power supply transitions to the drive unit ON state (e). Moreover, with the vehicle power supply in the ACC-ON state, when the driver presses the vehicle power supply switch while stepping on the brake pedal, the vehicle power supply transitions to the drive unit ON state (f).

On the other hand, with the vehicle power supply in the drive unit ON state, when the driver presses the vehicle power supply switch while the gearshift is in the parking position, the vehicle power supply transitions to the LOCK state (g). Alternatively, with the vehicle power supply in the drive unit ON state, when the driver presses the vehicle power supply switch while the gearshift is in a position other than the parking position, the vehicle power supply transitions to the ACC-ON state (h).

As shown in a lower half of FIG. 4, the on and off states of each of the accessory power supply (ACC) and the ignition power supply (IG) of the vehicle and the on and off states of the drive unit change corresponding to the state transitions of the vehicle power supply as described above. Note that the uninterrupted power supply (+B) is always on, regardless of a state of the vehicle power supply switch. Specifically, when the vehicle power supply is in the LOCK state, the accessory power supply is in the off state, the ignition power supply is in the off state, and the drive unit is in the off state. In other words, in the LOCK state, power supply from all the power supplies of the vehicle, except the uninterrupted power supply, and the drive unit fall in stopped states.

Moreover, when the vehicle power supply is in the ACC-ON state, the accessory power supply is in the on state, the ignition power supply is in the off state, and the drive unit is in the off state. Furthermore, when the vehicle power supply is in the IG-ON state, the accessory power supply is in the on state, the ignition power supply is in the on state, and the drive unit is in the off state. In each of the ACC-ON and IG-ON states, the generator (alternator) does not operate because the drive unit is stopped, and under such a situation in which the generator of the vehicle is stopped, the on-board battery is not charged. However, equipment for audio, navigation, and the like is in a state of being able to be activated due to power from the accessory power supply (or the ignition power supply).

Moreover, when the vehicle power supply is in the drive unit ON state, the accessory power supply is in the on state, the ignition power supply is in the on state, and the drive unit is in the on state. In the drive unit ON state, the generator operates due to starting of the drive unit, the on-board battery is charged, and all the in-vehicle equipment is in a state of being able to be activated.

In the display device for vehicle 1 according to the present embodiment, the second microcomputer 32, which receives uninterrupted power supply from the power supply control part 34 in the electronic control unit (IDS-ECU) 30, performs optimal power supply control, in conjunction with the on or off state of each power supply corresponding to a state transition of the vehicle power supply as described above, as well as with a vehicle state acquired through the communication line of the in-vehicle network 4, and the first microcomputer 31 is thus switched between operating and stopping. The second microcomputer 32 can control its own operation status between in-operation and sleep. Moreover, the second microcomputer 32 transmits power supply control signals D1, D2 to the power supply control part 14 in the driver display unit 10, and the power supply control part 23 in the touch display unit 20, respectively, whereby the driver display 11, the touch display 21, and the telltale display 13 are switched between operating and stopping.

Specifically, when the vehicle power supply is in the LOCK state, a state is brought about where only the uninterrupted power supply is in the on state while the other power supplies are in the off state, and the driver is not using the vehicle. Accordingly, while the driver display 11, the touch display 21, and the first microcomputer 31 are stopped, the telltale display 13 connected to the uninterrupted power supply operates with power from the interrupted power supply, through the second microcomputer 32, according to a vehicle state acquired through the communication line of the in-vehicle network 4.

As shown in FIG. 2, the driver display 11 and the touch display 21 include the wide display screens 11A, 21A, respectively. Accordingly, when the driver display 11 and the touch display 21 are caused to operate, large liquid crystal panels respectively covering the display screens 11A, 21A need to be driven, and the liquid crystal panels also need to be illuminated with the back lights, so that relatively large amounts of power are consumed to drive the liquid crystal panels and the back lights. Moreover, since display control of the driver display 11 and the touch display 21 is performed by the first microcomputer 31 in an integrated manner, the first microcomputer 31 is equipped with a high-throughput GPU. Accordingly, power consumption of the first microcomputer 31 also increases, compared to power consumption of a microcomputer before integration that individually performs display control of each display. Specifically, electric current required to drive the driver display 11, the touch display 21, and the first microcomputer 31 is approximately several amperes (A) in total, in some cases.

If an attempt is made to display a telltale by using the driver display 11 (or the touch display 21) when the vehicle power supply is in the LOCK state, without providing the telltale display 13 as in the present embodiment, the driver display 11 (or the touch display 21) and the first microcomputer 31, which consume large amounts of power, need to be driven by power from the uninterrupted power supply. In the LOCK state, since the drive unit of the vehicle is stopped and the on-board battery is not charged by using the generator (alternator), the battery may be greatly consumed.

In contrast, the display device for vehicle 1 according to the present embodiment is provided with the telltale display 13 adjacent to the driver display 11, and with the second microcomputer 32 that controls a display state of the telltale display 13. The telltale display 13 is configured by using a plurality of LEDs and operates with lower power consumption than each of the driver display 11 and the touch display 21. Moreover, the second microcomputer 32 only controls a driven state of each LED of the telltale display 13 and operates with lower power consumption than the first microcomputer 31. Specifically, electric current required to drive the telltale display 13 and the second microcomputer 32 is merely on the order of hundreds of milliamperes (mA) in total.

Accordingly, in the display device for vehicle 1 according to the present embodiment, when the vehicle power supply is in the LOCK state, the telltale display 13 and the second microcomputer 32 that consume less power are driven by power from the uninterrupted power supply, and a required telltale is displayed. At this time, since the driver display 11, the touch display 21, and the first microcomputer 31, which consume large amounts of power, can be stopped, battery consumption can be restrained.

Moreover, when the vehicle power supply is in the ACC-ON state, the uninterrupted power supply and the accessory power supply are in the on states. Accordingly, in addition to the telltale display 13 and the second microcomputer 32, the driver display 11, the touch display 21, and the first microcomputer 31 operate with power from the accessory power supply. At the time, although the drive unit is stopped and the on-board battery is not charged by using the generator, the integrated display system is in full operation because audio, navigation, and the like are activated when the accessory power supply is turned on. In other words, in the ACC-ON state, due to a functional constraint of the in-vehicle system, it is impossible to stop the driver display 11, the touch display 21, and the first microcomputer 31 in order to reduce power consumption. Such a situation also holds true when the vehicle power supply is in the IG-ON state.

Accordingly, the display device for vehicle 1 according to the present embodiment is configured in such a manner that, among the plurality of telltales set in the vehicle, a telltale that needs to be displayed when the ignition power supply is in the off state and the drive unit is stopped is displayed by using the telltale display 13 and the second microcomputer 32, and a telltale that does not need to be displayed in the same state is displayed by using the driver display 11 and the first microcomputer 31. In other words, the display device for vehicle 1 is not configured to display all the telltales set in the vehicle on the telltale display 13 side, but divides the plurality of telltales into groups according to whether or not display is required by regulation when the ignition power supply is in the off state (the drive unit is in the stopped state), and separates the telltales to be displayed on the telltale display 13 side from the telltales to be displayed on the driver display 11 side.

A telltale that needs to be displayed when the ignition power supply is in the off state has to be displayed even in the LOCK state in which the integrated display system is not in operation, and is therefore to be displayed on the telltale display 13 side. On the other hand, as for a telltale that does not need to be displayed when the ignition power supply is in the off state, it is efficient to configure the telltale to be displayed on the driver display 11 side because a requirement of regulations or the like can be fulfilled if the telltale is displayed by the integrated display system that enters full operation in the ACC-ON state or the IG-ON state. By separating telltales to be displayed as described above, since the telltale display 13 that consumes less power can be used, battery consumption in the LOCK state can be effectively restrained.

As described above, the display device for vehicle 1 according to the present embodiment includes the first microcomputer 31, which controls, in an integrated manner, a display state of each of the plurality of displays (driver display 11, touch display 21) mounted in the vehicle, and the second microcomputer 32, which operates with lower power consumption than the first microcomputer 31 and controls a display state of the telltale display 13. Display control of the plurality of displays is performed by the common first microcomputer 31, whereby display and functionality of each of the displays can be controlled in conjunction, and also, a display content on each of the displays can be freely changed by software, according to performance and functionality of a vehicle in which each display is mounted. Accordingly, the versatile display device for vehicle 1 can be realized. Moreover, a display state of the telltale display 13, which is provided separately from the plurality of displays, is controlled by the second microcomputer 32 that consumes less power than the first microcomputer 31, whereby power consumed when a telltale is display can be reduced, and battery consumption can be restrained.

Moreover, the display device for vehicle 1 according to the present embodiment is configured in such a manner that when the accessory power supply is in the off state, that is, in a situation in which the generator of the vehicle is stopped, the second microcomputer 32, which receives uninterrupted power supply from the power supply control part 34 in the electronic control unit (IDS-ECU) 30, detects the off state of the accessory power supply and also detects a vehicle state through the communication line of the in-vehicle network 4, whereby the telltale display 13, which operates with power from the uninterrupted power supply, can be driven, while the plurality of displays (driver display 11, touch display 21) and the first microcomputer 31 are stopped. Thus, since power consumption of the display device for vehicle 1 is reduced when the accessory power supply is in the off state (the vehicle power supply is in the LOCK state), battery consumption can be reliably restrained.

Moreover, in the display device for vehicle 1 according to the present embodiment, the telltale display 13 is configured to operate with lower power consumption than each of the plurality of displays. Thus, when a telltale is displayed, battery consumption can be more effectively restrained than when the driver display 11 is used.

In addition, in the display device for vehicle 1 according to the present embodiment, the telltale display 13 is configured to display a telltale that needs to be displayed when the ignition power supply is in the off state, among the plurality of telltales set in the vehicle. Moreover, at least one (the driver display 11) of the plurality of displays is configured to display information including a telltale that does not need to be displayed when the ignition power supply is in the off state, among the plurality of telltales set in the vehicle. According to such a configuration, since only a telltale that needs to be displayed when the ignition power supply is in the off state and the engine is stopped is displayed by using the telltale display 13 and the second microcomputer 32, the telltale display 13 can achieve further power savings, and battery consumption can be restrained more effectively.

Although an embodiment of the present invention has been described above, the present invention is not limited to the above-described embodiment, and various modifications and changes can be made on the basis of the technical idea of the present invention. For example, although the embodiment describes an example in which the telltale display 13 is provided adjacent to the driver display 11, the telltale display 13 may be provided adjacent to the touch display 21.

Moreover, the embodiment describes an example in which information related to a vehicle speed, cumulative travel distance information, and the like is displayed on the driver display 11, and information related to audio, navigation, and the like is displayed on the touch display 21. However, part of the information related to a vehicle speed, cumulative travel distance information, and the like may be displayed on the touch display 21, or part of the information related to audio, navigation, and the like may be displayed on the driver display 11. Furthermore, the information displayed on the driver display 11 and the touch display 21 can also be interchanged.

Furthermore, although the embodiment illustrates an example in which the telltale display 13 is configured by using a plurality of LEDs, the telltale display 13 may be configured by using, for example, light-emitting devices such as organic EL devices. In addition, although activation (hazarding) of the right and left turn signals, lighting of the headlights, up-pointing (high beam) of the headlights, lighting of the front fog light, lighting of the rear fog light, and the state in which a door is not completely closed are mentioned as examples of telltales displayed on the telltale display 13, a telltale other than the foregoing can obviously also be displayed on the telltale display 13.

The invention claimed is:

1. A display device comprising a plurality of displays mounted in a vehicle, and an electronic control unit that controls, in an integrated manner, information displayed on the plurality of displays, wherein
the display device comprises a telltale display that displays a telltale of the vehicle, and
the electronic control unit comprises:
a first microcomputer that controls a display state of each of the plurality of displays, and
a second microcomputer that operates with lower power consumption than the first microcomputer and controls a display state of the telltale display.

2. The display device according to claim 1, wherein the electronic control unit is configured in such a manner that in a situation in which a generator of the vehicle is stopped, the telltale display and the second microcomputer operate with power from an uninterrupted power supply, while the plurality of displays and the first microcomputer are stopped.

3. The display device according to claim 1, wherein the telltale display is configured to operate with lower power consumption than each of the plurality of displays.

4. The display device according to claim 1, wherein
the telltale display is configured to display a telltale that needs to be displayed when an ignition power supply is in an off state, among a plurality of the telltales set in the vehicle, and
at least one of the plurality of displays is configured to display information including a telltale that does not need to be displayed when the ignition power supply is in the off state, among the plurality of telltales.

* * * * *